J. MARKUS.
PROCESS OF FORMING ARTICLES FROM WASTE RUBBER.
APPLICATION FILED JULY 9, 1910.
999,819.
Patented Aug. 8, 1911.
2 SHEETS—SHEET 1.
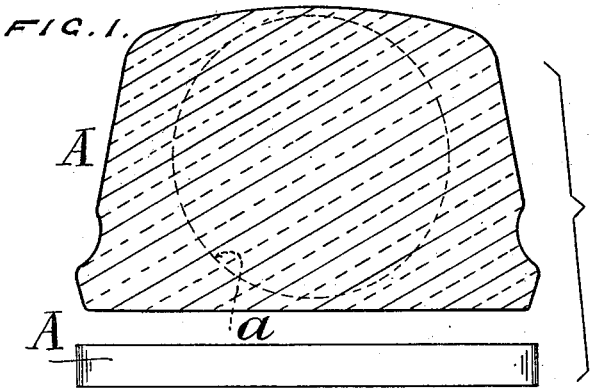
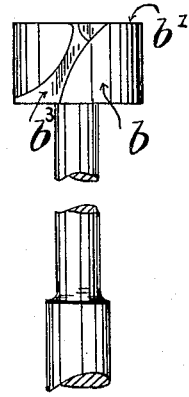
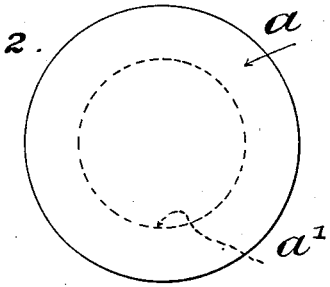
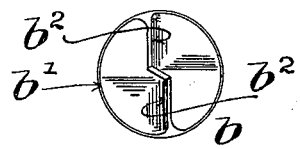
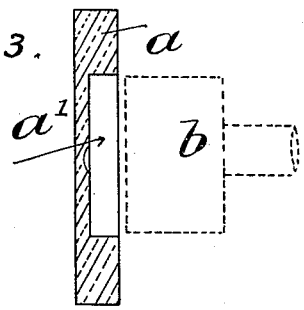
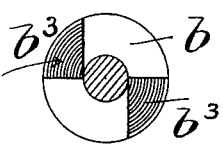
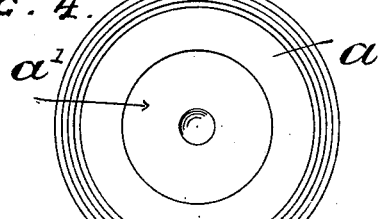
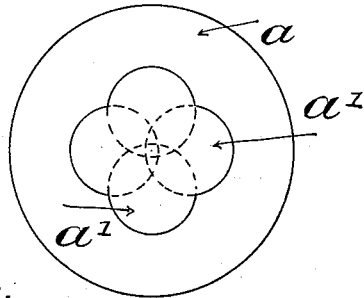
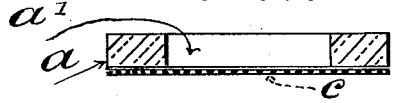
WITNESSES
INVENTOR
JOHN MARKUS.
By his attorney
COLUMBIA PLANOGRAPH CO., WASHINGTON, D. C.

J. MARKUS.
PROCESS OF FORMING ARTICLES FROM WASTE RUBBER.
APPLICATION FILED JULY 9, 1910.

999,819.

Patented Aug. 8, 1911.

WITNESSES

INVENTOR
JOHN MARKUS
By his attorney

# UNITED STATES PATENT OFFICE.

JOHN MARKUS, OF MANCHESTER, ENGLAND.

PROCESS OF FORMING ARTICLES FROM WASTE RUBBER.

999,819.

Specification of Letters Patent. Patented Aug. 8, 1911.

Application filed July 9, 1910. Serial No. 571,158.

*To all whom it may concern:*

Be it known that I, JOHN MARKUS, a subject of the King of Great Britain and Ireland, residing at 107 Corporation street, Manchester, in the county of Lancaster, England, rubber manufacturer, have invented an Improved Process of Forming Articles from Waste Rubber, of which the following is a specification.

This invention relates to a new process for utilizing manufactured waste rubber, whereby, such articles as boot heels or pads can be cheaply produced from high quality rubber waste which has served a former purpose.

I take rubber waste such as discarded cab tires, bus tires, sheet waste, and make same into rubber heels of an exceedingly good quality by a process involving slicing, shaping or cutting and thereafter by removing the centers or drilling away the rubber to a sufficient extent at the center or otherwise removing rubber to accommodate the fastening means and finally by pressing the so formed or treated blank in a mold with sufficient heat and for sufficient time. Under present systems this waste rubber while of good quality is sold at a very low price per pound, as the ordinary re-working is so expensive.

I regard the feature of removing the center entirely, or to a requisite depth from the blanks, or removing a portion to accommodate fastening means, by the aid of a rotary drill or cutter as a most important feature of my invention.

The novel features, and the art of manufacture according to my invention, are hereafter fully set forth.

Figure 10:
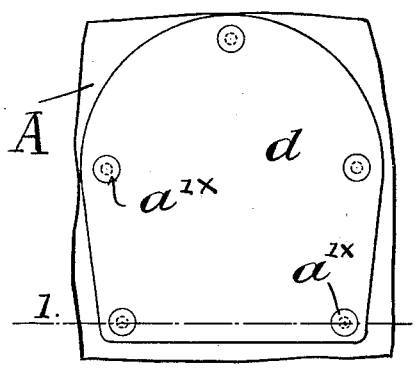
Figure 12:
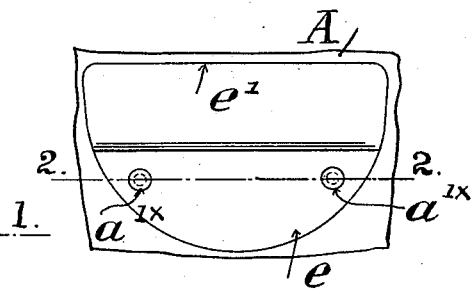
Figure 11:
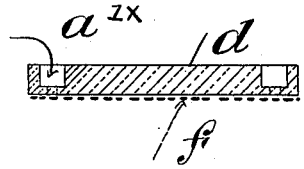
Figure 13:
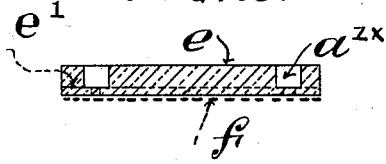

In the drawings:—Figure 1 indicates a section of vehicle tire waste which I cut into strips (see the plan view same figure). Fig. 2 shows a disk punched therefrom. Fig. 3 is a section, and shows such a disk with the center removed to the required extent. Fig. 4 shows a finished disk, after pressing. Fig. 5 indicates a pad with a modified shape as to the center. Figs. 6, 7 and 8 are, respectively, elevation and front and back plan views, on a reduced scale, of the preferred form of boring or cutting tool for removing the center portion of the pad. Fig. 9 shows a modified way of producing the pad. Fig. 10 shows a modified pad, in plan view, and made from a waste blank with the recesses for the fastening means drilled away by a boring or cutting tool. Fig. 11 is a section on the line 1—1 Fig. 10. Fig. 12 shows a tip piece with drilled or cut out recesses for the fastening means. Fig. 13 is a section on the line 2—2 Fig. 12.

In carrying out my invention I take good quality waste rubber such as discarded vehicle tires, or other rubber bodies which have served their purpose, and I slice the same into strips or blanks A of the desired thickness by means of a suitable guillotine, or by cutting knives, and I trim to shape if necessary, either by hand or by mechanical appliances. I thereafter punch these blanks and produce shaped or annular disks such as $a$, see Fig. 2. Thereafter I remove the center portion or area to a suitable depth, as at $a'$ Fig. 3, to present a recess to accommodate the usual metal fastening plate. This removal of the center portion is most conveniently done by a boring or cutting tool, and, for example, by the cutter or drill $b$ shown in Figs. 6, 7 and 8, which has an annular cutting edge $b'$, and straight cutting edges $b^2$, $b^2$, together with channels $b^3$, $b^3$, to allow the rubber cut away to pass to the back of the cutter tool head. After being acted on by the cutter, or equivalent boring appliance, used to remove the center to the desired extent, the shaped rubber disk with recessed central area as in Fig. 3 is then inserted in a mold forming part of a press, or the mold is inserted in a press and the blank subjected to pressure under a suitable heat—say about 160° Fahrenheit. This temperature or heat may be greatly varied. By subjecting to pressure under a comparatively low heat, the heel pad can be molded over an extended period of time and may so be brought to perfect shape and form and with any desired ridges or grooves, a finished pad such as represented in Fig. 4 being formed. The recess $a'$ may be of any suitable shape to correspond with the contour of the pad within which it is formed. For example, I may use a somewhat smaller cutter and cut away the pad to the shape shown by using the tool in four different positions, as Fig. 5 indicates.

According to a modified system, the rubber disks $a$, obtained as described from waste blanks, may be cut or bored or punched away altogether as to the center at $a'$ (see Fig. 9), and may have a thin disk $c$ of rubber or canvas, or both, placed at the back to form a backing and also the central web, and the heel pad consisting of the two or more parts may then be put into a press or mold and subjected to pressure and sufficient heat as before related to obtain a finished pad.

I may make pads of modified form or rubber tips from such sliced waste A cutting the same to shape from the slices, and Figs. 10, 11, 12 and 13 represent pads and tips so made. The waste is cut to shape and blanks $d\ e$ such as shown, are punched out. These are drilled or cut by a small drill or boring tool to produce holes or recesses $a'^x$ which accommodate or house the heads of the fastening devices by which the pads $d$ or tips $e$ are secured to the boot. A thin tongue $e'$ may be provided with respect to the tips $e$ to assist in securing them. The blanks, after the drilling or boring operation, are subjected to heat and pressure in a mold to produce the finished article and ridges or ornamental patterns may be impressed on the blank by the mold if desired. A backing of canvas such as indicated by dotted lines at $f$ may be applied to the finished pads or tips.

My process does away with re-manufacture in the sense of making a new rubber mass and enables me to utilize a good quality of rubber waste for the production of heel pads while the incidental waste is practically of the same value as the waste upon which I operate. I can thus produce high quality pads and similar articles, in simple fashion, and at a low price.

I declare that what I claim is—

1. The herein described process of forming heel pads from waste rubber which consists in forming a blank by cutting a flat strip from waste and to the desired thickness, shaping the blank, drilling the blank, and subjecting the blank to pressure and to a heat below the original vulcanization heat to give a superficial finish, as set forth.

2. The herein described process of forming boot heels from waste rubber, which consists in slicing waste in a cold state to form a flat blank of the desired thickness, punching the blank to shape, drilling the blank, and subjecting the blank so obtained to pressure and heat below the original vulcanization heat whereby a superficial finish is imparted to the blank, as set forth.

3. The herein described process of forming rubber heels from waste rubber which consists in cutting a flat blank to a desired thickness, shaping the blank to heel form, drilling a recess in the blank to a suitable depth, and subjecting the blank to pressure and heat below the original vulcanization heat to impart a finish to the heel pad, as set forth.

4. The herein described process of forming boot heels from waste rubber which consists in cutting flat pieces of desired thickness, punching to shape, forming a cut recess in the center to leave a thinner central area and subjecting the blank to pressure in a mold and to a heat below the original vulcanization heat to impart an exterior finish, as set forth.

5. The herein described process of forming boot heels from waste rubber, which consists in cutting flat strips of desired thickness from said waste, punching to shape, drilling a recess in the center, and subjecting the drilled away and perfectly shaped blank to pressure in a mold, at a heat below the original vulcanization heat to allow of a superficial finish being imparted, as described.

In testimony whereof I have signed my name to this specification in the presence of two subscribing witnesses.

JOHN MARKUS.

Witnesses:
RICHARD IBBERSON,
ALFRED YATES.